(12) United States Patent
Yamazaki et al.

(10) Patent No.: US 8,773,732 B2
(45) Date of Patent: Jul. 8, 2014

(54) IMAGE READING APPARATUS

(75) Inventors: Akira Yamazaki, Kanagawa (JP);
Ryusuke Nakata, Kanagawa (JP);
Senggyu Cho, Kanagawa (JP); Munseok Yang, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 127 days.

(21) Appl. No.: 13/452,312

(22) Filed: Apr. 20, 2012

(65) Prior Publication Data
US 2013/0083368 A1    Apr. 4, 2013

(30) Foreign Application Priority Data

Oct. 3, 2011    (JP) .................................. 2011-219468

(51) Int. Cl.
*H04N 1/04*    (2006.01)

(52) U.S. Cl.
USPC ............ 358/474; 358/497; 358/498; 358/475

(58) Field of Classification Search
USPC .................................. 358/474, 497, 498, 475
See application file for complete search history.

(56) References Cited

U.S. PATENT DOCUMENTS

2010/0014127 A1*    1/2010    Osakabe et al. ............... 358/497
2011/0235082 A1*    9/2011    Mukai .......................... 358/1.13

FOREIGN PATENT DOCUMENTS

JP    A-2005-91794    4/2005

* cited by examiner

*Primary Examiner* — Houshang Safaipour
(74) *Attorney, Agent, or Firm* — Oliff PLC (57) ABSTRACT

An image reading apparatus comprises a reading unit including a document table, a cover portion covering the document table, an opening and closing mechanism having a first and second mounting portions and opening and closing the cover portion to an opened and a closed state, a covering member rotating about a rotating shaft of a member side and covering at least a portion of an exposed portion, and a rotating regulating unit regulating rotation of the covering member due to the weight of the covering member in a state where the center of gravity of the covering member is separated further from the cover portion than the rotating shaft of the member side, and where the covering member covers at least a portion of the exposed portion within a movement range of the opening and the closing of the cover portion.

7 Claims, 8 Drawing Sheets

IMAGE READING APPARATUS

CROSS-REFERENCE TO RELATED APPLICATIONS

This application is based on and claims priority under 35 USC 119 from Japanese Patent Application No. 2011-219468 filed Oct. 3, 2011.

BACKGROUND

Technical Field

The present invention relates to an image reading apparatus.

SUMMARY

According to an aspect of the invention, there is provided an image reading apparatus including a reading unit that includes a document table provided on an upper surface portion of the reading unit and reads a document on the document table; a cover portion that covers the document table; an opening and closing mechanism that includes a first mounting portion being mounted on the cover portion and protruding in a transverse direction and a second mounting portion being mounted on the reading unit and protruding upward, and that opens and closes the cover portion to an opened state where the document table is exposed and a closed state where the document table is covered by rotating the first mounting portion and the second mounting portion about a rotating shaft of a mechanism side; a covering member that is mounted so as to be rotated about a rotating shaft of a member side disposed along the rotating shaft of the mechanism side in the cover portion or the first mounting portion and that covers at least a portion of an exposed portion exposed from the cover portion and the reading unit in the first mounting portion and the second mounting portion; and a rotating regulating unit that regulates rotation of the covering member due to the own weight of the covering member in a state where the center of gravity of the covering member is separated further from the cover portion than the rotating shaft of the member side, and where the covering member covers at least a portion of the exposed portion within a movement range of the opening and the closing of the cover portion.

BRIEF DESCRIPTION OF THE DRAWINGS

Exemplary embodiments of the present invention will be described in detail based on the following figures, wherein:

FIGS. 7A to 7C show movement of the protective cover according to the opening and closing operation of the platen cover.

DETAILED DESCRIPTION

Hereinafter, an example of an exemplary embodiment according to the present invention will be described with reference to the drawings.

Configuration of Imaging Forming Apparatus According to Present Exemplary Embodiment First, a configuration of an image forming apparatus according to the present exemplary embodiment will be described.

Figure 1:
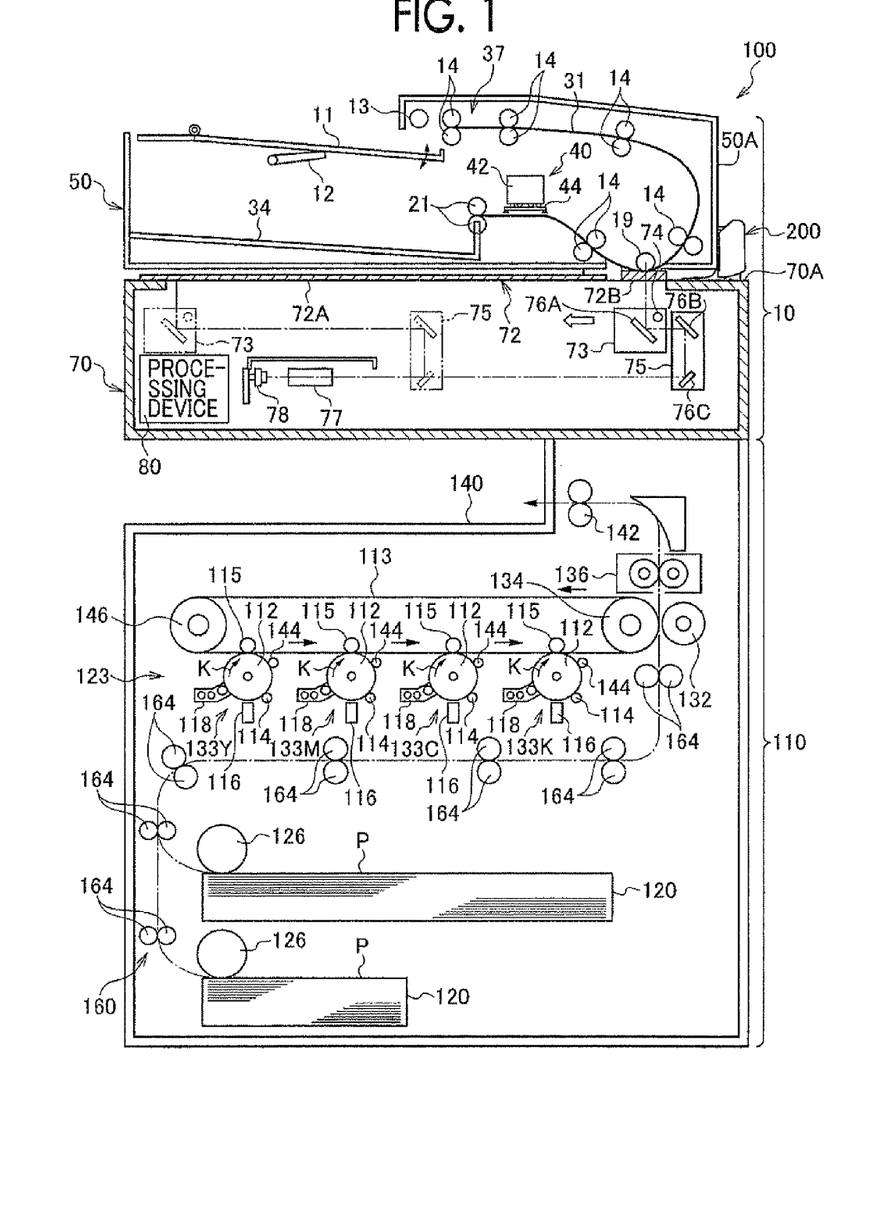
FIG. 1 is a schematic view showing the entire configuration of an image forming apparatus according to an exemplary embodiment of the present invention.

As shown in FIG. 1, an image forming apparatus 100 according to the present exemplary embodiment includes an image recording apparatus 110 which records an image on a recording medium P such as paper and an image reading apparatus 10 which reads an image of a document. The image reading apparatus 10 is disposed on the upper portion of the image forming apparatus 100 and the image recording apparatus 110 is disposed at the lower portion of the image forming apparatus 100.

The image reading apparatus 10 reads the image of the document and converts the read image into an image signal. The image recording apparatus 110 may record the image on the recording medium P based on the image signal which is converted by the image reading apparatus 10.

Configuration of Image Recording Apparatus 110

Next, a configuration of the image recording apparatus 110 will be described.

The image recording apparatus 110 includes a recording medium accommodating unit 120 in which the recording medium P such as paper is accommodated, an image forming section 123 which forms a toner image on the recording medium P, a transport unit 160 which transports the recording medium P from the recording medium accommodating unit 120 to the image forming section 123, a fixing device 136 which fixes the toner image formed by the image forming section 123 on the recording medium P, and a recording medium discharging unit 140 which discharges the recording medium P on which the toner image is fixed by the fixing device 136.

The image forming section 123 includes image forming units 133Y, 133M, 133C, and 133K in which the toner image of each of yellow (Y), magenta (M), cyan (C), and black (K) is formed, an intermediate transfer belt 113 which is an example of an intermediate transfer member to which the toner image formed by the image forming units 133Y, 133M, 133C, and 133K is transferred, a primary transfer roll 115 which is an example of a primary transfer member which transfers the toner image formed by the image forming units 133Y, 133M, 133C, and 133K to the intermediate transfer belt 113, and a secondary transfer roll 132 which is an example of a secondary transfer member transferring the toner image transferred to the intermediate transfer belt 113 to the recording medium P.

The image forming units 133Y, 133M, 133C, and 133K each include a photoconductor drum 112 which is an image holding member holding the formed image and is rotated in one direction (direction of K shown in FIG. 1).

In the periphery of each photoconductor drum 112, from the upstream side in the rotation direction of the photoconductor drum 112, a charging device 114 which charges the photoconductor drum 112, an exposure device 116 which exposures the charged photoconductor drum 112 and forms an electrostatic latent image on the photoconductor drum 112, a developing device 118 which develops the electrostatic latent image formed on the photoconductor drum 112 and forms a toner image, and a removal device 144 which removes the toner remaining on the surface of the photoconductor drum 112 after the toner image is transferred to the intermediate transfer belt 113 are provided in the above order.

The intermediate transfer belt 113 is supported by an opposing roll 134 which is opposed to the secondary transfer roll 132 and a support roll 146, and is circulated and moves in one direction (clockwise direction in FIG. 1) while contacting the photoconductor drum 112.

The primary transfer roll 115 is opposed to the photoconductor drum 112 while interposing the intermediate transfer belt 113. A primary transfer position, in which the toner image formed on the photoconductor drum 112 is primarily transferred to the intermediate transfer belt 113, is formed between the primary transfer roll 115 and the photoconductor drum 112.

The secondary transfer roll 132 is opposed to the opposing roll 134 while interposing the intermediate transfer belt 113. A secondary transfer position, in which the toner image primarily transferred to the intermediate transfer belt 113 is secondarily transferred to the recording medium P, is formed between the secondary transfer roll 132 and the opposing roll 134.

The transport unit 160 includes a feeding roll 126 which feeds the recording medium P accommodated in the recording medium accommodating unit 120 and a transport roll pair 164 which transports the recording medium P fed by the feeding roll 126 to the secondary transfer position.

The fixing device 136 is disposed further to the downstream side in the transport direction than the second transfer position and fixes the toner image transferred at the secondary transfer position on the recording medium P.

A discharging roll pair 142 which discharges the recording medium P to the recording medium discharge unit 140 is disposed further to the downstream side in the transport direction than the fixing device 136.

Image Forming Operation

Next, in the image forming apparatus according to the present exemplary embodiment, an image forming operation which forms the image will be described.

In the image recording apparatus 110 according to the present exemplary embodiment, when the image is formed on the recording medium P, first, the recording medium P fed from the recording medium accommodating unit 120 is fed to the secondary transfer position by the transport roll pair 164.

On the other hand, in the intermediate transfer belt 113, the toner image of each color formed by the image forming units 133Y, 133M, 133C, and 133K is overlapped and a color image is formed. The color image formed on the intermediate transfer belt 113 is transferred to the recording medium P which is fed to the secondary transfer position.

The recording medium P to which the toner image is transferred is transported to the fixing device 136 and the transferred toner image is fixed by the fixing device 136. The recording medium P on which the toner image is fixed is discharged to the recording medium discharge unit 140 by the discharging roll pair 142. In the manner described above, a series of image forming operations is performed.

Moreover, the configuration of the image recording apparatus is not limited to the above-described configuration. For example, a direct transfer type of image recording apparatus without the intermediate transfer member or an ink jet type of image recording apparatus may be adopted. In addition, image recording apparatus capable of recording the image according to configurations other than above-described configurations may be also adopted.

Configuration of Image Reading Apparatus

Next, a configuration of the image reading apparatus according to the present exemplary embodiment will be described.

The image reading apparatus 10 according to the present exemplary embodiment may read both documents which are transported and documents which are still.

Figure 2:
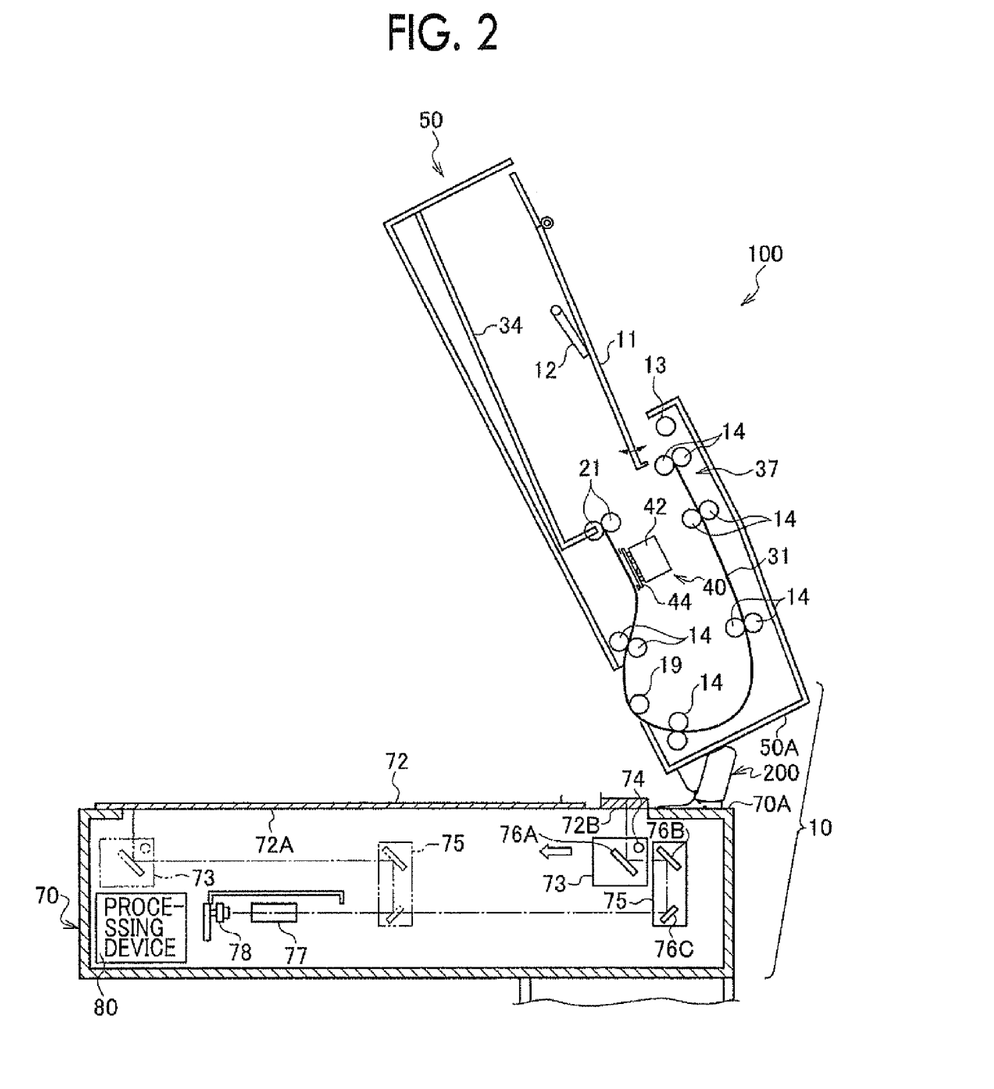
FIG. 2 is a schematic view showing a configuration of a reading mechanism according to the present exemplary embodiment.

As shown in FIGS. 1 and 2, a document table (platen) 72 is provided on the upper surface portion of the image reading apparatus 10, and the image reading apparatus 10 includes a reading unit 70 which reads the document on the document table 72 and a platen cover 50 which is an example of a cover portion covering the document table 72. The platen cover 50 is opened and closed between a closed state (FIG. 1) where the document table 72 is covered by the opening and closing mechanism 200 and a fully opened state (FIG. 2) where the document table 72 is exposed (also refer to FIGS. 7A to 7C). In the present exemplary embodiment, the platen cover 50 may be opened up to a maximum of 75° from horizontal (document table 72). That is, the fully opened state shown in FIG. 2 (and FIG. 7C) is 75°.

The platen cover 50 includes a transport unit 37 having a folding shape which transports the document placed on the document placing table 11 to a document discharge unit 34 and the document discharge unit 34 to which the document transported in the transport path 31 is discharged.

A lifting and lowering mechanism 12 which lifts and lowers the document placing table 11 is provided in the document placing table 11. If the document is placed on the document placing table 11, the lifting and lowering mechanism 12 lifts the document placing table 11 up to a position in which the document comes into contact with a feeding roll 13 described below.

The reading unit 70 has the document table 72 which includes a first platen glass 72A which is an example of a transmitting member on which the document of the image to be read in the still state is placed and a second platen glass 72B which is an example of a transmitting member which transmits light radiated to the transported document.

The transport unit 37 includes the feeding roll 13 which feeds the documents from the document placing table 11, the transport path 31 in which the documents fed from the document placing table 11 are transported, plural transport rolls 14 which transport the documents disposed along the transport path 31 to the downstream side, an opposing roll 19 which is disposed in the transport path 31 and is disposed so as to be opposed to the second platen glass 72B configuring the document table 72, and discharging rolls 21 which discharge the documents to the document discharge unit 34. The opposing roll 19 presses the transported document on the second platen glass 72B.

Moreover, the reading unit 70 includes a first moving member 73 and a second moving member 75 which are capable of moving along the first platen glass 72A.

In the first moving member 73, a light radiating portion 74 which radiates light on the document and a first mirror 76A which receives the light which is reflected by the document are provided. In the second moving member 75, a second mirror 76B and a third mirror 76C which introduce the light obtained from the first mirror 76A are provided.

Moreover, the reading unit 70 includes an imaging lens 77 which optically reduces the optical image obtained from the third mirror 76C and a CCD (Charge Coupled Device) image sensor 78 which photoelecrically converts the optical image imaged by the imaging lens 77. The image signals which are obtained by the CCD image sensor 78 are sent to the exposure device 116 (FIG. 1) by the processing device 80.

Here, first, when the image of the document placed on the first platen glass 72A is read, for example, the first moving member 73 and the second moving member 75 move in the scanning direction (direction of an arrow) by a ratio of 2:1. At this time, the light of the light radiating portion 74 of the first moving member 73 radiates the surface to be read of the document, and the light reflected from the document is reflected at the first mirror 76A, the second mirror 76B, and the third mirror 76C in the above order and is introduced to the imaging lens 77. The light introduced to the imaging lens 77 is imaged on a light receiving surface of the CCD image sensor 78. The CCD image sensor 78 is a one-dimensional sensor and simultaneously processes one line. If the one line of reading in the line direction (fast scanning direction of the scan) ends, the first moving member 73 moves in a direction perpendicular to the fast scanning direction (slow scanning direction) and reads the next line of the document. This is performed over the entire document size, completing the reading of one page of the document.

On the other hand, the document which is transported by the transport unit 37 passes through the second platen glass 72B. At this time, the first moving member 73 and the second moving member 75 are stopped at the position of a solid line shown in FIG. 1. First, the reflected light of the first line of the document via the opposing roll 19 is imaged on the imaging lens 77 via the first mirror 76A, the second mirror 76B, and the third mirror 76C and the image is read by the CCD image sensor 78. That is, after the one line in the fast scanning direction is simultaneously processed by the CCD image sensor 78 which is a one-dimensional sensor, the next line in the fast scanning direction of the document transported by the transport unit 37 is read. After the tip of the document reaches the reading position of the second platen glass 72B, the document passes through the reading position of the second platen glass 72B. Therefore, the reading of one page of the document over the slow scanning direction is completed.

The reading unit 70 is not limited to the above-described configuration. Configurations which read the image of the document by configurations other than the above-described configuration may be adopted.

Opening and Closing Mechanism

Figure 4A:
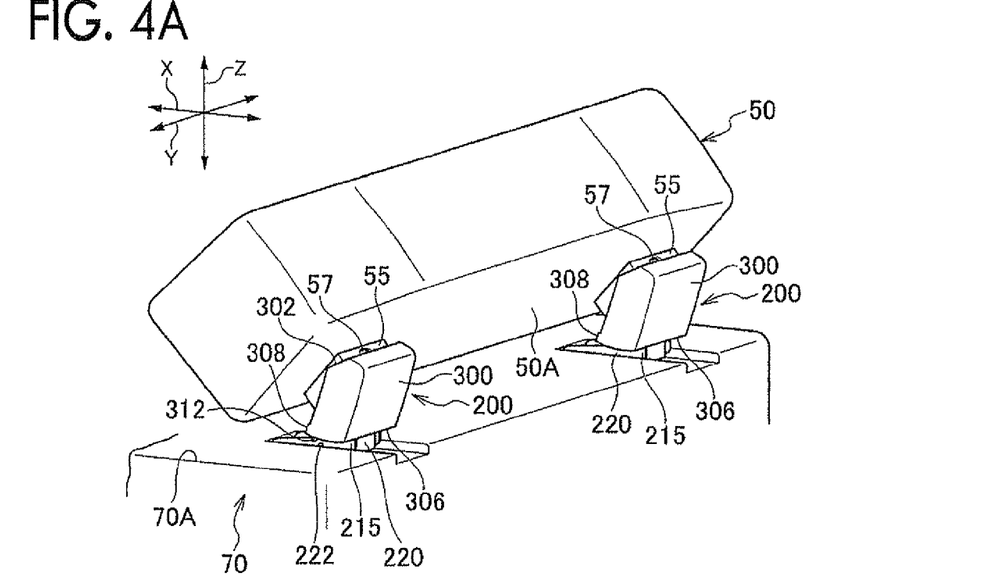
FIG. 4A is a perspective view showing the opening and closing mechanism shown in FIG. 3 in a state where a platen cover is opened and FIG. 4B is an enlarged perspective view showing a principle portion of FIG. 4A.
Figure 4B:
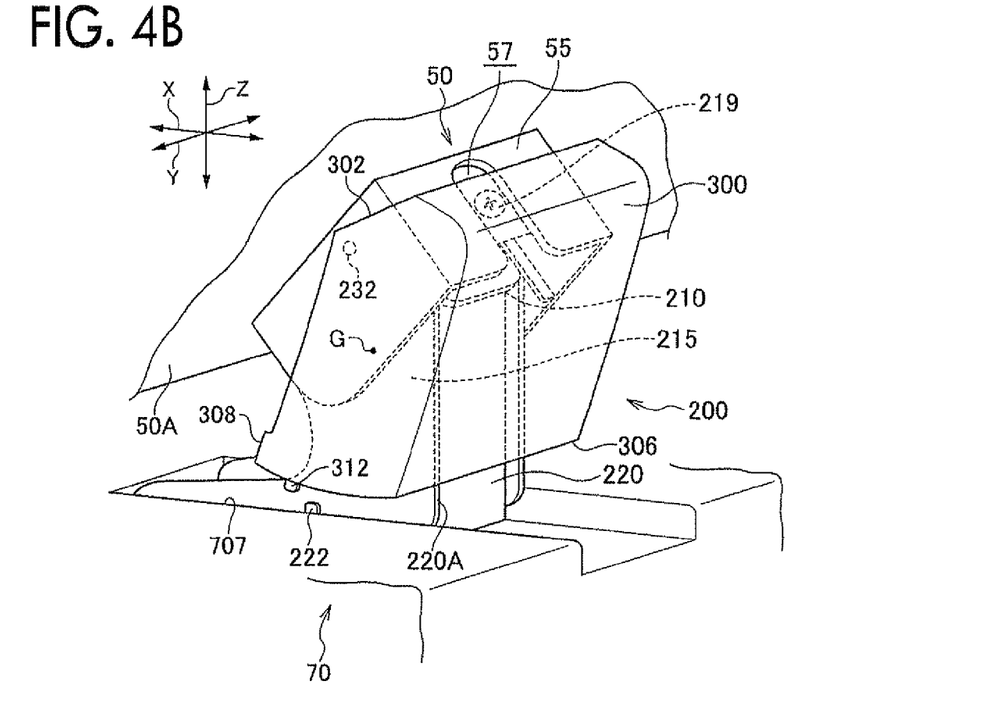
Figure 5:
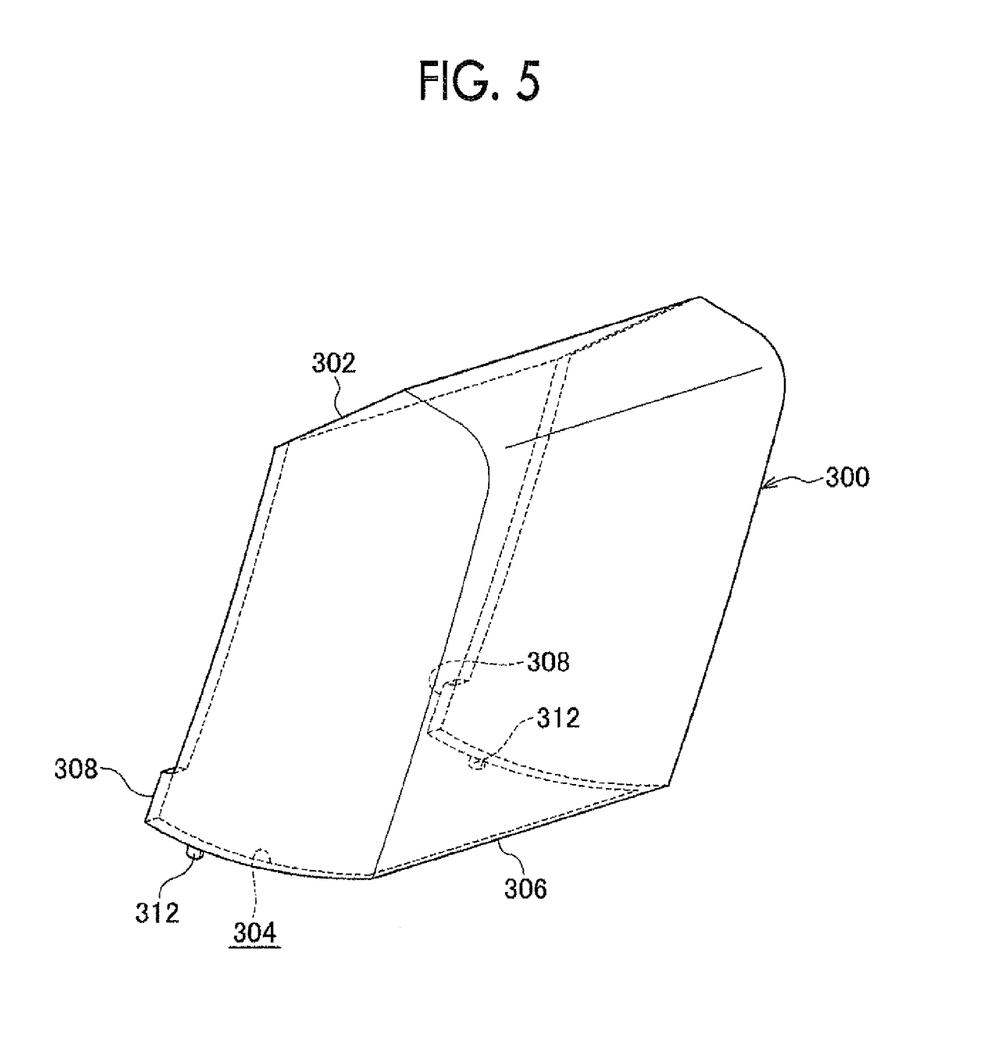
FIG. 5 is a perspective view showing a protective cover which configures the opening and closing mechanism shown in FIG. 3.

As shown in FIGS. 4A and 4B, the opening and closing mechanism 200 is provided at both ends in the width direction of the platen cover 50. As shown in FIGS. 1 and 2, the opening and the closing mechanism 200 has a hinge function which opens and closes between the closed state (FIG. 1) in which the document table 72 is covered and the fully opened state (FIG. 2) in which the document table 72 is exposed (also refer to FIG. 7A to 7C). When the platen cover 50 is opened to a predetermined angle or greater (equal to or more than 30° in the present exemplary embodiment and refer to FIG. 7B), the opening and closing mechanism 200 has a counterbalance mechanism which stops the platen cover in the opened state by generating a force against the force in which the platen cover 50 is to be closed by gravity with a spring or the like. Since a mechanism similar to known mechanisms (structures) is used as the counterbalance mechanism, a detailed description, is omitted. As described above, in the present exemplary embodiment, the platen cover 50 may be opened up to a maximum of 75° from horizontal (the document table 72) (refer to FIGS. 2 and 7C).

In addition, in the state where the platen cover 50 is closed (refer to FIG. 1), the width direction is the Y direction, the vertical direction is the Z direction, and the direction perpendicular to the Y direction and the Z direction is the X direction.

Figure 3:
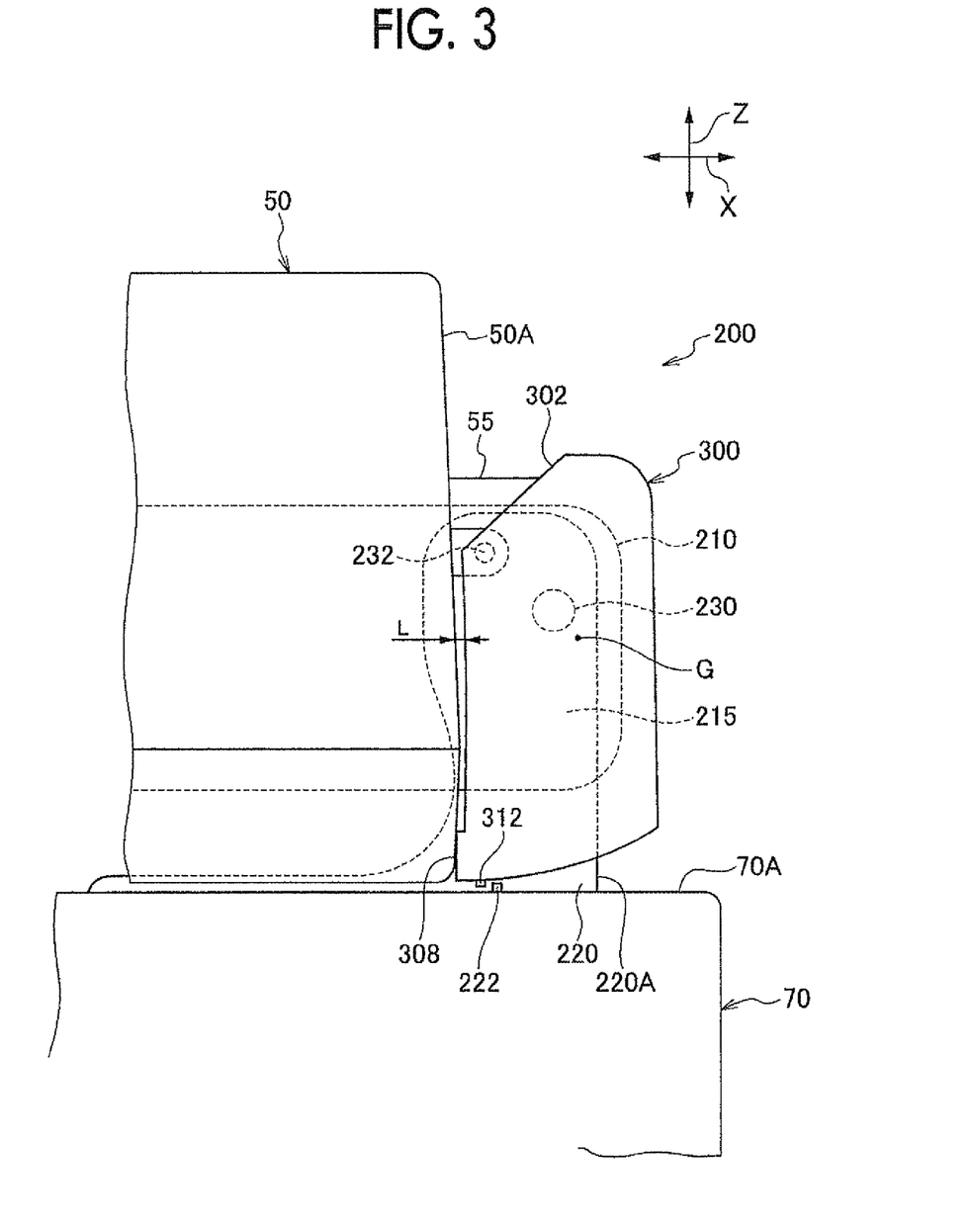
FIG. 3 is a front view showing an opening and closing mechanism according to the present exemplary embodiment when viewed from a direction of a rotating shaft.

As shown in FIGS. 3 and 4A and 4B, the opening and closing mechanism 200 includes a first mounting portion 210 and a second mounting portion 220. The first mounting portion 210 is mounted on the platen cover 50 and protrudes in the X direction (transverse direction) from an end 50A of the platen cover 50. The second mounting portion 220 is mounted on the reading unit 70 and protrudes upward in the vertical direction from an upper surface portion 70A of the reading unit. The end in the protruding direction of the first mounting portion 210 and the end in the protruding direction of the second mounting portion 220 are overlapped with each other and are connected so as to be rotated about a rotating shaft 230 (an example of a rotating shaft of a mechanism side; refer to FIG. 3) which is disposed with the Y direction as the axial direction. The first mounting portion 210 and the second mounting portion 220 are rotated about the rotating shaft 230, and therefore, the platen cover 50 is opened and closed between the closed state (FIG. 1) in which the document table 72 is covered and the opened state (FIG. 2) in which the document table 72 is exposed.

Moreover, in the present exemplary embodiment, the first mounting portion 210 and the second mounting portion 220 are made of a metal, and a portion, which protrudes from the platen cover 50 and the reading unit 70 in the first mounting portion 210 and the second mounting portion 220 and is exposed, is an exposed portion 215.

The upper end of the exposed portion 215 (first mounting portion 210) is covered by an eaves portion 55 which is integrally configured with the end 50A of the platen cover 50. A U-shaped notch 57 (refer to FIGS. 4A and 4B) is formed on the upper surface portion of the eaves portion 55. The notch 57 is configured so that an adjustment screw 219 (refer to FIG. 4B) may be rotated (refer to FIGS. 4A and 4B) and make the heights of both ends in the width direction (Y direction) of the platen cover 50 uniform by inserting a tool such as a screwdriver from the notch 57.

As shown in FIGS. 3 and 4A and 4B, the outsides of the eaves portion 55 and the exposed portion 215 are covered by a protective cover 300 which is an example of a covering member. As shown in FIGS. 3 to 6D, the platen cover 50 side of the protective cover 300 is opened, the bottom surface of the protective cover is not formed, and the protective cover is formed in a substantially box shape. In other words, the platen cover 50 side of the protective cover 300 becomes an opening side and is formed in a substantially groove shape, and a ceiling surface is formed in the upper end side of the protective cover. An inclined portion 302 which is inclined to the platen cover 50 side toward the lower side is formed in the upper end of both side walls in the width direction of the protective cover 300. As described above, the side surface (bottom surface) is not formed on the lower end of the protective cover 300, and a substantially U-shaped recessed portion 304 is formed in the lower end.

The protective cover 300 is provided so as to be rotated about a rotating shaft 232 (an example of a rotating shaft of the member side) which is provided in the vicinity of the end 50A of the platen cover 50 in the eaves portion 55. Moreover, the rotating shaft 232 is disposed with the Y direction as the axial direction. The rotating shaft 232 of the protective cover 300 is disposed further to the platen cover 50 side and further to the upper side in the vertical direction than the rotating shaft 230 of the first mounting portion 210 and the second mounting portion 220.

A convex portion 308 which protrudes the platen cover 50 side is formed in the lower end of the protective cover 300. As shown in FIG. 3, in the state where the platen cover 50 is closed (refer to FIG. 1), the convex portion 308 abuts on the end 50A of the platen cover 50 and the rotation of the protective cover 300 around the rotating shaft 232 due to its own weight is stopped. In the state where the convex portion 308 abuts on the end 50A of the platen cover 50 and the rotation is stopped, the protective cover 300 covers the exposed portion 215 and the center of gravity G of the protective cover 300 is configured so as to be separated further in the X direction from the platen cover 50 than the rotating shaft 232.

Figure 7A:
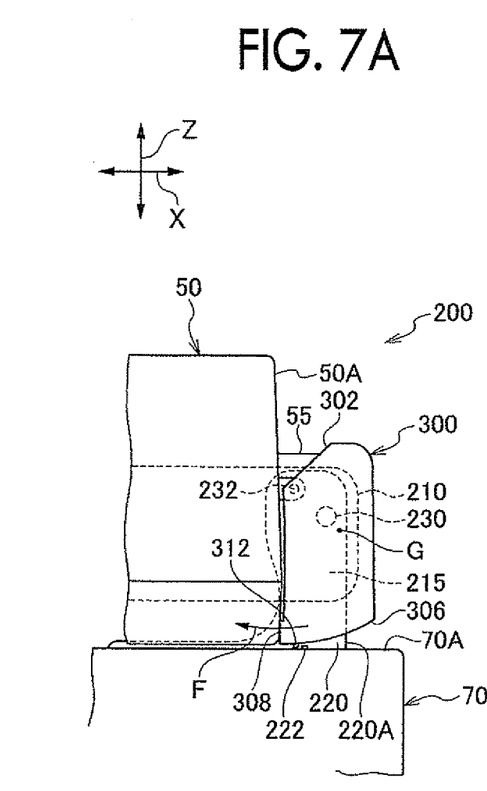
FIG. 7A is a view showing a state where the platen cover is closed.
Figure 7B:
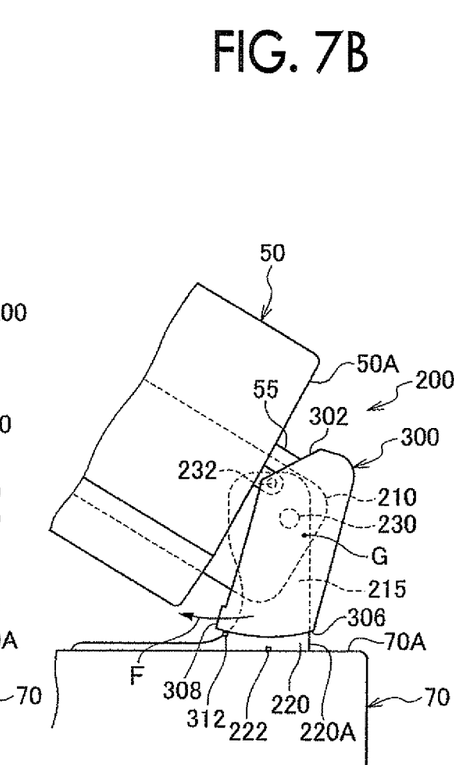
FIG. 7B is a view showing a state where the platen cover is opened about 30°.
Figure 7C:
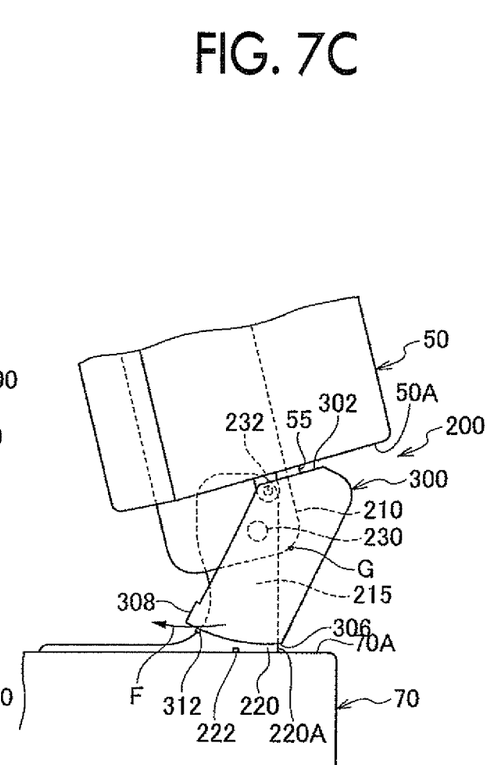
FIG. 7C is a view showing a state where the platen cover is opened 75°.

As shown in FIGS. 7A to 7C, when the platen cover 50 is opened, the platen cover 50 is rotated around the rotating shaft 230, and the end 50A moves, according to this, the protective cover 300 is rotated due to its own weight However, a bottom side portion 306 of the recessed portion 304 of the protective cover 300 abuts on an end 220A of the second mounting portion 220, and the rotation of the protective cover 300 around the rotating shaft 232 due to its own weight is stopped. Moreover, in the state where the protective cover 300 abuts on the second mounting portion 220 and the rotation is stopped, the protective cover 300 is configured so that the protective cover covers the exposed portion 215 and the center of gravity G moves to a position further in the X direction from the platen cover 50 than the rotating shaft 232.

Even in the state where the platen cover 50 is fully opened, since the inclined portion 302 is formed on the upper end of both side walls in the width direction of the protective cover 300, the end 50A of the platen cover 50 and the upper end of the protective cover 300 do not interfere with each other.

In addition, in the closed state of the platen cover 50 of FIG. 7A and the fully opened state of the platen cover 50 of FIG. 7C, the heights of the rotating shaft 232 of the protective cover 300 may be configured so as to be the same to each other or the height of FIG. 7C may be configured so as to be higher than that of FIG. 7A.

As shown in FIGS. 3 to 6D, a protruding portion 312 which protrudes downward in the vertical direction is formed in the lower end of the protective cover 300. Moreover, shown in FIG. 3, in the closed state where the convex portion 308 of the protective cover 300 abuts on the end 50A in the closed state of the platen cover 50, a protruding portion 222 is formed in a position which is separated further from the end 50A than the protruding portion 312 in the upper surface portion 72A of the document table 72. If the protective cover 300 is rotated in a direction opposite to the rotation of the protective cover 300 around the rotating shaft 232 due to its own weight, the protruding portion 312 interferes with the protruding portion 222.

Figure 6A:
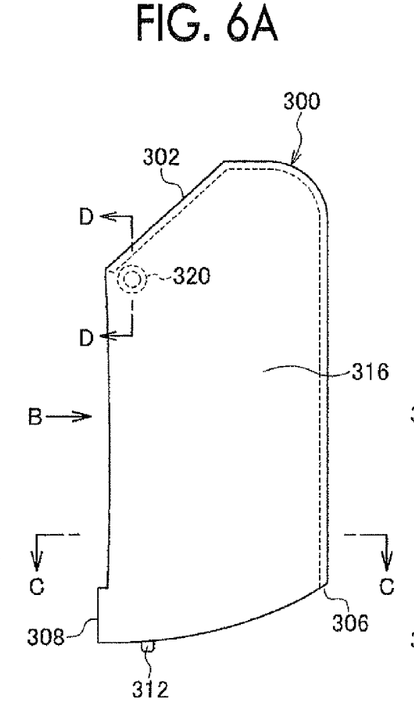
FIG. 6A is a front view showing the protective cover shown in FIG. 5.
Figure 6B:
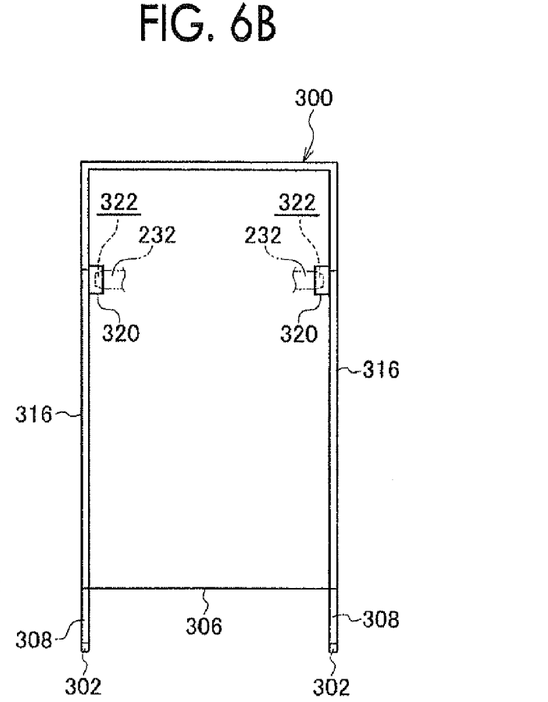
FIG. 6B is a view of FIG. 6A when viewed from a direction of B.
Figures 6C, 6D:
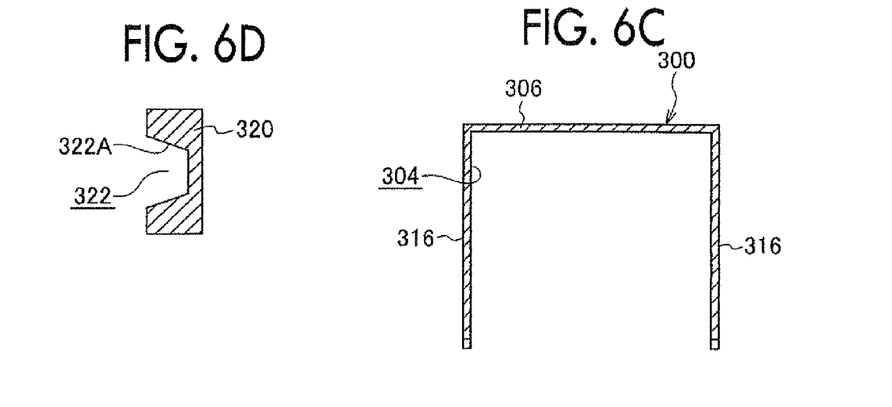
FIG. 6C is a cross-sectional view taken along a line C-C of FIG. 6A.
FIG. 6D is a cross-sectional view of a bearing showing a D-D cross-section of FIG. 6A.

As shown in FIGS. 6B and 6D, a bearing 320 which receives the rotating shaft 232 is formed on an inner wall surface of a side wall 316 of the protective cover 300. A recessed portion 322 is formed in the center portion of the bearing 320, the rotating shaft 232 is engaged to the recessed portion 322, and therefore, the protective cover 300 is mounted so as to be rotated. An inclined surface 322A is formed in an inner wall of the recessed portion 322, the diameter of the recessed portion 322 is decreased toward the bottom of the recessed portion 322, and the diameter of the recessed portion is increased toward the opening side (a direction in which the shaft is removed).

The protective cover 300 is made of a resin. Thereby, the side wall 316 of the protective cover 300 is elastically deformed to the outside in the Y direction, and the rotating shaft 232 may be engaged to the recessed portion 322 of the bearing 320.

Figure 8A:
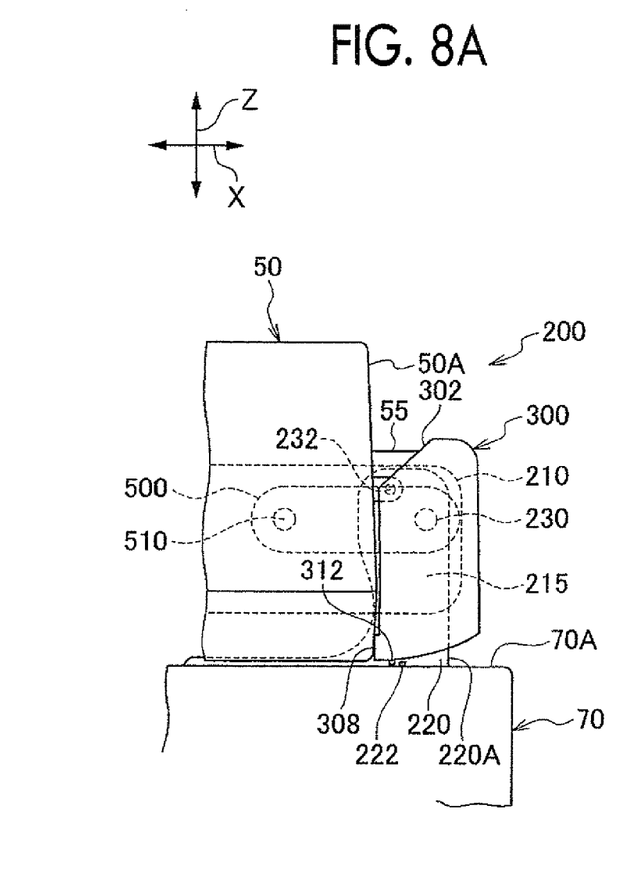
FIG. 8A is a front view showing a link mechanism of the opening and closing mechanism and FIG. 8B is a front view showing a state where a thick document, such as a book, is placed on a document table and the platen cover moves upward.
Figure 8B:
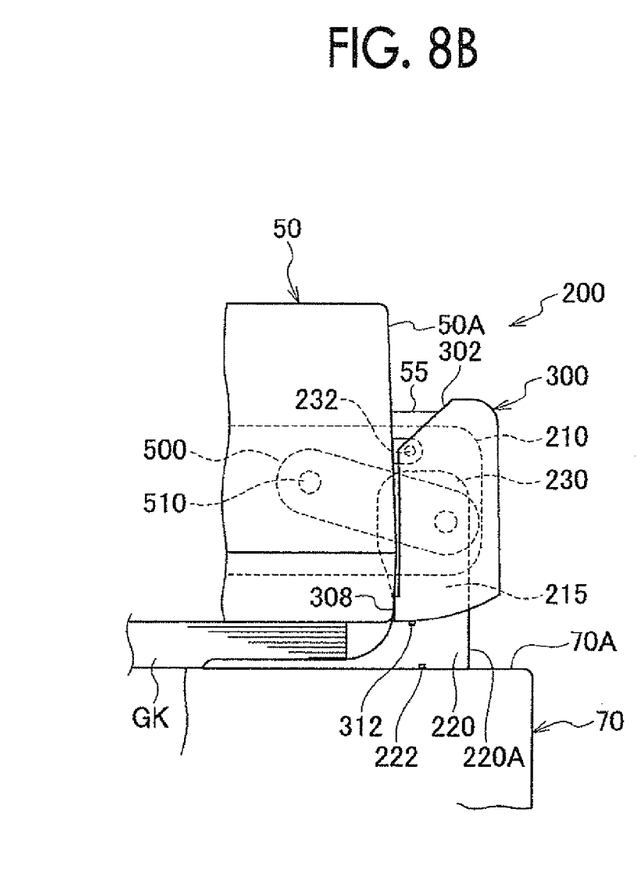

As shown in. FIGS. 8A and 8B, in the present exemplary embodiment, a third mounting portion 500 is provided in the opening and closing mechanism 200. The third mounting portion 500 is a link mechanism which is provided so as to be rotated with respect to the above-described rotating shaft 230 and the rotating shaft 510 provided in the platen cover 50. The third mounting portion 500 is smaller than the first mounting portion 210 in a side view (when viewed from the axial direction of the rotating shaft 230).

Operation and Effect

Next, operations and effects of the present exemplary embodiment will be described.

As shown in FIGS. 3 and 7A, in the state where the platen cover 50 is closed (refer to FIG. 1), the convex portion 308 abuts on the end 50A of the platen cover 50 and the rotation of the protective cover 300 due to its own weight is stopped. In the state where the convex portion 308 abuts on the end 50A of the platen cover 50 and the rotation of the protection cover is stopped, the center of gravity G of the protective cover 300 is positioned so as to be separated further from the platen cover 50 than the rotating shaft 232. Thereby, a rotation force F which is to be rotated to the end 50A side of the platen cover 50 is generated in the lower end of the protective cover 300, and the convex portion 308 of the protective cover 300 is urged to the end 50A by the rotation force F and is positioned.

As shown in FIGS. 4A, 4B, 7B and 7C, if the platen cover 50 is opened (refer to FIG. 2) and the end 50A of the platen cover 50 moves, according to this, the protective cover 300 is rotated due to its own weight. However, the bottom side portion 306 of the recessed portion 304 of the protective cover 300 abuts on the end 220A of the second mounting portion 220, and the rotation of the protective cover 300 due to its own weight is stopped. In the state where the protective cover 300 abuts on the second mounting portion 220 and the rotation of the protective cover is stopped, the center of gravity G of the protective cover 300 is positioned so as to be separated further from the platen cover 50 than the rotating shaft 232. Thereby, the rotation force F which is to be rotated to the end 50A side of the platen cover 50 is generated in the lower end of the protective cover 300, and the protective cover 300 is urged to the second mounting portion 220 by the rotation force F and is positioned.

In this way, without an urging unit such as a spring, the protective cover 300 is urged to the member which stops the rotation of the protective cover 300 due to its own weight (rotation force F). Moreover, regardless of the opening and closing position of the platen cover 50 (within the range of the opening and closing movement of the platen cover 50), the position covering the exposed portion 215, which protrudes from the platen cover 50 and the reading unit 70 in the first mounting portion 210 and the second mounting portion 220 and is exposed, by the protective cover 300 is positioned. Thereby, for example, the appearance is improved compared to the configuration in which the exposed portion is covered only at the closed state of the platen cover 50.

Even in the state where the platen cover 50 is fully opened, since the inclined portion 302 is formed in the upper end of both the side walls in the width direction of the protective cover 300, the end 50A of the platen cover 50 and the upper end of the protective cover 300 do not interfere with each other.

As shown in FIG. 3, the rotating shaft 232 of the protective cover 300 is provided in the vicinity of the end 50A of the platen cover 50. Thereby, compared to the configuration in which the rotating shaft 232 is separated from the end 50A of the platen cover 50, a gap L between the protective cover 300 and the end 50A of the platen cover 50 is decreased. Moreover, since the convex portion 308 of the protective cover 300 which protrudes the platen cover 50 side abuts on the end 50A of the platen cover 50, the gap L is substantially constant in the Y direction. That is, in the case where the convex portion 308 of the protective cover 300 is not present (the configuration in which the lower end of the protective cover directly abuts), the gap L is narrowed toward the lower side. In this way, compared to the configuration in which the gap L is increased and is not substantially constant, the appearance is improved in the configuration in which the gap L is decreased and is substantially constant.

Moreover, since the rotation of the protective cover 300 due to its own weight in the opened state of the platen cover 50 is stopped by the abutment of the protective cover on the second mounting portion 200, the configuration of the present invention is simple compared the configuration in which a separated member for stopping the rotation is provided.

In the closed state where the convex portion 308 of the protective cover 300 abuts on the end 50A in the closed state of the platen cover 50, the protruding portion 222 is formed at a position which is separated further from the end 50A than the protruding portion 312 in the upper surface portion 72A of the document table 72. Therefore, if the protective cover 300 is rotated in the direction opposite to the rotation direction due to its own weight, the protruding portion 312 of the protective cover 300 abuts on the protruding portion 222 of the document table 72 side, and thereby, the protective cover is not further rotated. Thus, the exposure of the exposed portion 215 of the opening and closing mechanism 200 due to the rotation in the opposite direction of the protective cover 300 is prevented or suppressed.

As shown in FIGS. 6A to 6D, the inclined surface 322A is formed in the recessed portion 322 of the bearing 320 of the side wall 316 of the protective cover 300, and the diameter of the recessed portion 322 is increased toward the opening side of the recessed portion. Thereby, the protective cover 300 is removed by a smaller force than that of the case where the inclined surface 322A is not formed in the recessed portion 322. Moreover, even if a great force (a force greater than a predetermined threshold value) is applied which damages the protective cover in a comparative example in which the inclined surface 322A is not formed, since the inclined surface 322A is provided so that the protective cover 300 is removed, damage to the protective cover 300 is prevented.

As shown in FIGS. 7A to 7C, in the present exemplary embodiment, the rotating shaft 232 of the protective cover 300 moves in the up and down directions according to the opening and closing operation of the platen cover 50. Thereby, as shown in FIG. 7B, the protective cover 300 is lifted according to the movement of the rotating shaft 232, and the gap between the upper surface portion 70A of the reading unit 70 and the protective cover is increased. Moreover, if an article is interposed in the gap in the state where the gap is increased and the opening and closing operating is continued, a great force is added to the upper portion of the protective cover 300. However, as described above, the protective cover 300 is easily removed in the above case. Therefore, damage to the protective cover 300 is prevented. Moreover, in the case where article is interposed in the gap, since a great force is applied to the upper side of the protective cover 300, the inclined surface may be only formed in the upper surface side of the recessed portion 322.

Here, in the present exemplary embodiment, as shown in FIGS. 8A and 8B, the opening and closing mechanism 200 includes a link mechanism such as the third mounting portion 500. Thereby, as shown in FIG. 8B, when a thick document (a book or the like) GK is placed on the document table 72 and read, the entire platen cover 50 may move parallel to the upper portion. Moreover, even when the platen cover 50 moves upward in this way, the protective cover 300 also moves upward. However, since the protective cover 300 covers the exposed portion 215 of the opening and closing mechanism 200, the appearance is improved. Also in this case, the protective cover 300 is lifted, the gap between the platen cover and the upper surface portion 70A of the reading unit 70 is increased, and even if an article is interposed in the gap, since the protective cover 300 is easily removed as described above, damage to the protective cover 300 is prevented.

Others

In addition, the present invention is not limited to the above-described exemplary embodiment.

For example, in the exemplary embodiment, the convex portion 308 abuts on the end 50A of the platen cover 50 in the state where the platen cover 50 is closed (refer to FIG. 1) and the rotation of the protective cover 300 due to its own weight is stopped. However, the present invention is not limited thereto. For example, similar to the state where the platen cover 50 is opened, the present invention may be configured so that the bottom side portion 306 of the recessed portion 304 of the protective cover 300 abuts on the end 220A of the second mounting portion 220 and the rotation of the protective cover 300 due to its own weight is stopped. That is, even in the state where the platen cover 50 is closed or opened, the present invention may be configured so that the bottom side portion 306 of the recessed portion 304 of the protective cover 300 abuts on the end 220A of the second mounting portion 220 and the rotation of the protective cover 300 due to its own weight is stopped.

In the exemplary embodiment, the upper end of the exposed portion 215 (first mounting portion 210) of the opening and closing mechanism 200 is covered by the eaves portion 55 which is integrally configured with the end 50A of the platen cover 50. However, the present invention is not limited thereto. That is, the eaves portion 55 may be not present. When the eaves portion 55 is not present, the rotating shaft 232 of the protective cover 300 is provided in the first mounting portion 210 which configures the opening and closing mechanism 200.

In addition, in the exemplary embodiment, the protective cover 300 (an example of a covering member) covers substantially the entire portion of the exposed portion 215 and covers substantially the entire portion of the exposed portion 215 within the movement range of the opening and the closing of the platen cover 50 (an example of a cover portion) However, the present invention is not limited thereto. That is, the present invention may be configured so that the protective cover 300 (an example of a covering member) covers at least a portion of the exposed portion 215 and covers at least a portion of the exposed portion 215 within the movement range of the opening and the closing of the platen cover 50 (an example of a cover portion).

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image reading apparatus comprising:
   a reading unit that includes a document table provided on an upper surface portion of the reading unit and that reads a document on the document table;
   a cover portion that covers the document table;
   an opening and closing mechanism that includes a first mounting portion being mounted on the cover portion and protruding in a transverse direction and a second mounting portion being mounted on the reading unit and protruding upward, and that opens and closes the cover portion to an opened state where the document table is exposed and a closed state where the document table is covered by rotating the first mounting portion and the second mounting portion about a rotating shaft of a mechanism side;
   a covering member that is mounted so as to be rotated about a rotating shaft of a member side disposed along the rotating shaft of the mechanism side in the cover portion or the first mounting portion and that covers at least a portion of an exposed portion exposed from the cover portion and the reading unit in the first mounting portion and the second mounting portion; and
   a rotating regulating unit that regulates rotation of the covering member due to the own weight of the covering member in a state where the center of gravity of the covering member is separated further from the cover portion than the rotating shaft of the member side, and where the covering member covers at least a portion of the exposed portion within a movement range of the opening and the closing of the cover portion,
   wherein the rotating regulating unit includes a first rotation stopping portion that is (1) provided at a lower end side of the covering member, (2) abuts on the cover portion in the state where the cover portion is closed, and (3) stops the rotation of the covering member due to the own weight of the covering member, and
   the rotating regulating unit includes a second rotation stopping portion that is (1) provided at the lower end side of the covering member, (2) abuts on the second mounting portion in the state where the cover portion is opened, and (3) stops the rotation of the covering member due to the own weight of the covering member.

2. An image reading apparatus comprising:
   a reading unit that includes a document table provided on an upper surface portion of the reading unit and that reads a document on the document table;
   a cover portion that covers the document table:
   an opening and closing mechanism that includes a first mounting portion being mounted on the cover portion and protruding in a transverse direction and a second mounting portion being mounted on the reading unit and protruding upward, and that opens and closes the cover portion to an opened state where the document table is exposed and a closed state where the document table is covered by rotating the first mounting portion and the second mounting portion about a rotating shaft of a mechanism side;
   a covering member that is mounted so as to be rotated about a rotating shaft of a member side disposed along the rotating shaft of the mechanism side in the cover portion or the first mounting portion and that covers at least a portion of an exposed portion exposed from the cover portion and the reading unit in the first mounting portion and the second mounting portion;
   a rotating regulating unit that regulates rotation of the covering member due to the own weight of the covering member in a state where the center of gravity of the covering member is separated further from the cover portion than the rotating shaft of the member side, and where the covering member covers at least a portion of the exposed portion within a movement range of the opening and the closing of the cover portion; and
   a unit for preventing a reverse rotation that prevents the lower end of the covering member from being rotated in a direction separating from the cover portion in the state where the cover portion is closed.

3. The image reading apparatus according to claim 1, further comprising:
   a unit for preventing a reverse rotation that prevents the lower end of the covering member from being rotated in a direction separating from the cover portion in the state where the cover portion is closed.

4. An image reading apparatus comprising:
   a reading unit that includes a document table provided on an upper surface portion of the reading unit and that reads a document on the document table;
   a cover portion that covers the document table;
   an opening and closing mechanism that includes a first mounting portion being mounted on the cover portion and protruding in a transverse direction and a second mounting portion being mounted on the reading unit and protruding upward, and that opens and closes the cover portion to an opened state where the document table is exposed and a closed state where the document table is covered by rotating the first mounting portion and the second mounting portion about a rotating shaft of a mechanism side;
   a covering member that is mounted so as to be rotated about a rotating shaft of a member side disposed along the rotating shaft of the mechanism side in the cover portion or the first mounting portion and that covers at least a portion of an exposed portion exposed from the cover portion and the reading unit in the first mounting portion and the second mounting portion; and
   a rotating regulating unit that regulates rotation of the covering member due to the own weight of the covering member in a state where the center of gravity of the covering member is separated further from the cover portion than the rotating shaft of the member side, and where the covering member covers at least a portion of the exposed portion within a movement range of the opening and the closing of the cover portion,
   wherein a bearing supported by the rotating shaft of the member side is provided in the covering member, and
   the bearing includes at least an inclined surface that is inclined upward toward an opening side of the bearing.

5. The image reading apparatus according to claim 1,
   wherein a bearing supported by the rotating shaft of the member side is provided in the covering member, and the bearing includes at least an inclined surface that is inclined upward toward an opening side of the bearing.

6. The image reading apparatus according to claim 2, wherein a bearing supported by the rotating shaft of the member side is provided in the covering member, and the bearing includes at least an inclined surface that is inclined upward toward an opening side of the bearing.

7. The image reading apparatus according to claim 3, wherein a bearing supported by the rotating shaft of the member side is provided in the covering member, and the bearing includes at least an inclined surface that is inclined upward toward an opening side of the bearing.

* * * * *